Sept. 29, 1936.  E. HYATT  2,056,136
HORTICULTURAL GUARD
Filed May 20, 1936

Inventor:
EDWARD HYATT,
by his Attorneys.

Patented Sept. 29, 1936

2,056,136

UNITED STATES PATENT OFFICE 2,056,136

HORTICULTURAL GUARD

Edward Hyatt, Cleveland Heights, Ohio, assignor to The American Steel and Wire Company of New Jersey, a corporation of New Jersey Application May 20, 1936, Serial No. 80,831

9 Claims. (Cl. 47—23)

This invention relates to horticultural guards, and more particularly to wire guards adapted for the protection of growing plants, shrubs, trees and the like.

One of the objects of the present invention is to provide a guard of the class described, which will be durable and sturdy, and exceedingly economical to manufacture.

Another object of the present invention is to provide a guard for plants, shrubs, trees, etc., which will protect the growing things against the invasion of rodents and other animals, whose habits tend to destroy the same.

Still another object is to provide a guard that is easily and quickly installed in place without disturbing the plants, etc., and which will serve as a protection against an immoderate amount of wind, without depriving the plants, etc. from a normal amount of sunshine, moisture or air.

The foregoing and further objects will be apparent after referring to the drawing, in which.

Referring more specifically to the drawing in which like reference characters refer to like parts throughout.

Figures 1, 2, 3:
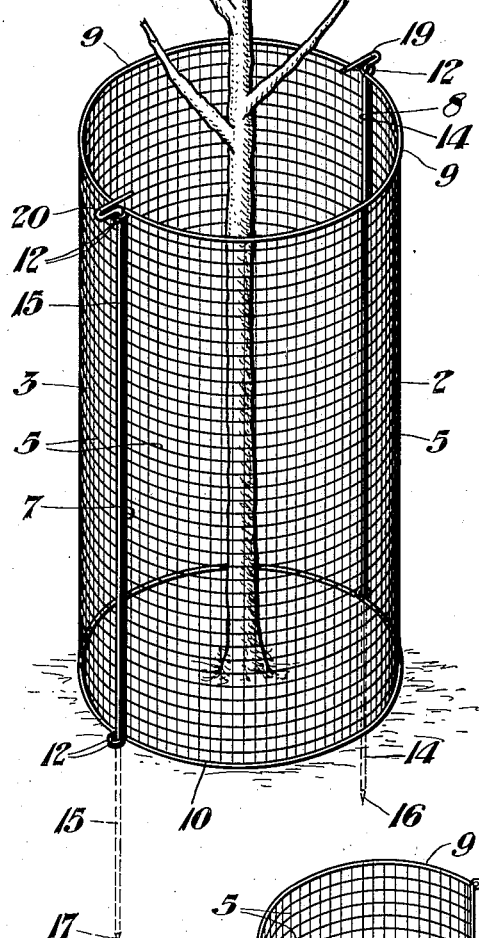
Figure 1 is a perspective of one form of my invention, illustrated as assembled in place about a young tree.
Figure 2 is also a perspective of two of the four elements comprising the invention as illustrated in Figure 1.
Figure 3 is a fragmentary perspective of a modification.

The guard of the invention, as shown in Figure 1, is composed of two complementary sections 2 and 3. Each section comprises substantially half of the completed guard, and is composed of a framework 4 of iron rods or other suitable material, and wire nettting 5.

The framework 4 is composed of upright members 7 and 8 and curved end members 9 and 10, which serve to connect the upright members at their opposite ends, respectively, to form a rigid structure. If desired, this framework may be fabricated from one rod, or any single piece of material, or may be made up of a plurality of pieces which may be welded, riveted, or otherwise secured together in any desired manner.

As each section is substantially a duplicate of the other, the same reference characters have been employed to designate the corresponding parts of each. It is desirable that each section be substantially the same as its mate in order that no particular arrangement or order of assembly need be followed, whereby each section is interchangeable with the other, as well as reversible and invertible.

The screening or wire netting 5 is secured to each section's framework 4 in any desired manner, preferably by welding.

Each section is provided with eyelets 12 so disposed as to overlap each other, or to be arranged with their respective centers in axial alinement when the edges 7 and 8 of each section are brought into abutting relation. The eyelets 12 may be integral with the frames 4 or attached thereto in any desired manner.

Two rods 14 and 15, preferably having sharpened end portions 16 and 17, respectively, are employed to hold the two sections 2 and 3 together to form the unitary guard. This is accomplished by passing the rod through the eyelets 12 of each section.

The rods 14 and 15 are of such length in excess of the height of the vertical framework elements 7 and 8 as to permit the sharpened ends thereof (16 and 17) to be driven a substantial distance into the ground as is indicated in broken lines in Figure 1. In this manner, a strong anchor is provided to insure against accidental displacement of the guard.

The ends of the rods 14 and 15, opposite the pointed ends thereof, may be formed, upset, or headed-over in any suitable manner, as at 19 and 20, to prevent the upper end of the rods from passing through the eyelets 12.

It will be apparent from the above description that many changes may be made in the specific structure shown and described, both as to shape, kind of materials used, etc., without departing from the true spirit of this invention. Obviously, the shape of the structure is immaterial so long as a closed barrier is provided. One section may compose the main portion of the guard by being appreciably larger than the other section, in which case the smaller section need only be of such size as will permit the larger section to be placed around a tree or plant before the smaller section is secured in place. Also, a cubical or rectilinear form may be used with the joints occurring at the convergence of the opposite sides thereof or alternatively at the edges of but one side.

The guard of the present invention is extremely economical to manufacture, sturdy of construction, and simple to install. It provides maximum facility of access to the plants, trees, etc., which it serves to protect in that it does not have to be completely removed when it is desired to tend the growths. By removing either one of the rods 14 and 15, the two sections 2 and 3 may be swung open, with the remaining rod serving as a pivot or hinge to provide easy access to the enclosed area.

If desired, the complementary sections 2 and 3 may be secured together by separate shorter rods (not shown) in lieu of the long rods 14 and 15. According to this embodiment, the shorter rods which connect the bottoms of the complementary sections 2 and 3 would also be driven into the ground to serve as anchors.

Another modification is shown in Figure 3 as comprising the formation of only one eyelet 12 on its upper end with a depending hook 12ª on the opposite end. The complementary section is oppositely constructed to enable interlocking. In this modification the bottom eyelets 12 would receive short rods 14ª in lieu of the longer rods 14 and 15.

While I have shown and described several specific embodiments of my invention, it will be understood that I do not wish to be limited exactly thereto, since various modifications may be made without departing from the scope of my invention, as defined by the following claims.

I claim:

1. A horticultural guard comprising a plurality of separable cage elements, and means for securing said cage elements together to form a unitary guard, said securing means being constructed and arranged to securely anchor said guard to the ground.

2. A horticultural guard comprising at least two cage elements, said elements being disposed in contiguous relationship to form a unitary guard having two joints, and ground anchor means associated with at least one of said joints to lock the same and to secure said guard to the ground.

3. A horticultural guard comprising at least two cage elements, said elements being disposed in contiguous abutting relationship to form a unitary guard having separable joints, and ground anchor means associated with said joints to lock the same against separation and to effectively anchor the guard to the ground at a plurality of points.

4. A horticultural guard comprising at least two cage elements disposed in contiguous, abutting relationship to form a unitary guard having a plurality of joints extending throughout its length, and a ground anchor removably associated with at least one of said joints to effectively lock the same, another of said joints being united by hinge means.

5. A horticultural guard comprising a plurality of separable barrier elements disposed in abutting relationship to form the contiguous walls of a unitary enclosure, and separable means associated with said elements to secure them to each other, said means serving to anchor the enclosure to the ground and selectively functioning as hinge or latch elements between the adjacent barrier elements.

6. A guard comprising a plurality of framework elements, a reticulated structure carried by said framework elements to form a plurality of barrier members, said barrier members being disposed vertically with their adjacent edges in abutting relation to form an enclosure, and means disposed along said abutting edges to secure the barrier members together, said securing means adapted to engage the ground to anchor said guard thereto.

7. A horticultural guard comprising a plurality of cage elements adapted for disposition about a growth, portions of said cage elements being adapted to rest upon the earth, other portions of said cage elements extending upwardly away from said first named portions and being constructed and arranged to abut each other to form substantially closed joints, and ground anchor means associated with at least one of said joints and cooperating with means thereon to lock the same.

8. In a guard of the class described, a plurality of barrier elements having marginal portions formed to register throughout their extent when placed in abutting relation, a plurality of eyelets disposed along said marginal portions of each of said elements, the eyelets of adjacent elements falling in axial alinement when their respective marginal portions abut each other, and rod members passing through said eyelets to secure said elements together.

9. In a guard of the class described, a plurality of barrier elements having marginal portions formed to register throughout their extent when placed in abutting relation, a plurality of eyelets disposed along said marginal portions of each of said elements, the eyelets of adjacent elements falling in axial alinement when their respective marginal portions abut each other, and rod members disposed through said eyelets to secure said elements together, said rods extending beyond the lower extremities of said guard a substantial distance to provide ground anchors therefor.

EDWARD HYATT.